(No Model.)

O. J. SEFTON.
TOE WEIGHT AND QUARTER BOOT FASTENER.

No. 444,023. Patented Jan. 6, 1891.

Witnesses:
Arthur Ashley
Geo. F. Byington

Inventor
Orlando J. Sefton
by John E. Latimer
Atty.

UNITED STATES PATENT OFFICE.

ORLANDO J. SEFTON, OF SEDGWICK, KANSAS.

TOE-WEIGHT AND QUARTER-BOOT FASTENER.

SPECIFICATION forming part of Letters Patent No. 444,023, dated January 6, 1891.

Application filed April 22, 1890. Serial No. 349,035. (No model.)

*To all whom it may concern:*

Be it known that I, ORLANDO J. SEFTON, a citizen of the United States, residing at Sedgwick, in the county of Harvey and State of Kansas, have invented certain new and useful Improvements in Toe-Weight and Quarter-Boot Fasteners; and I do hereby declare the following to be a full, clear, and exact description of the invention, such as will enable others skilled in the art to which it appertains to make and use the same.

My invention relates to an improved toe-weight and quarter-boot fastener.

The object of my invention is to construct a durable and inexpensive fastener, whereby toe-weights and quarter-boots are prevented from coming off after being placed in position on the horse's hoof; and to this end the nature of my invention consists of constructions and combinations, all as will hereinafter be set forth in the specification, and particularly pointed out in the claims, reference being had to the accompanying drawings, in which—

Figure 1:
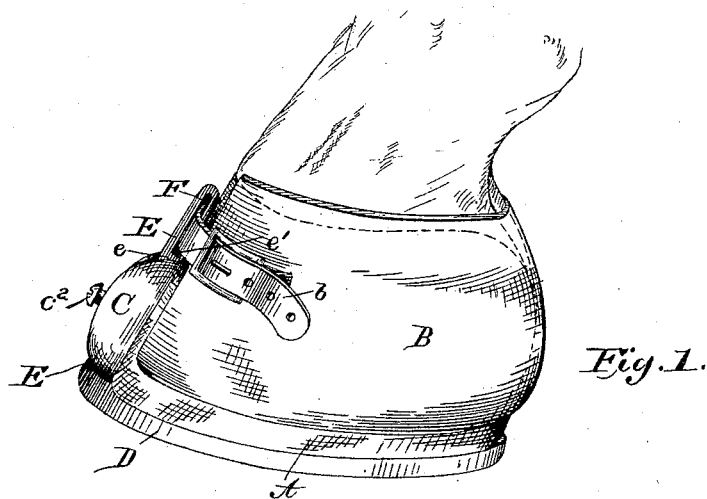
Figures 2, 3:
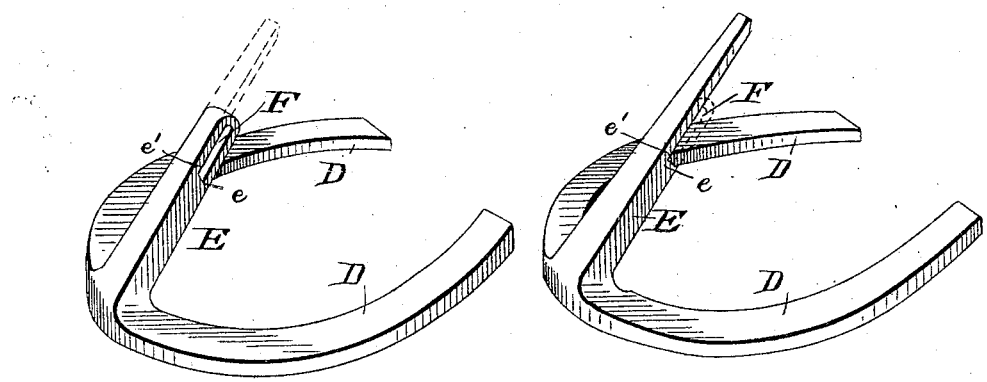

Figure 1 is a perspective view of a horse's hoof, showing a side view of the toe-weight and boot attached thereto. Fig. 2 shows the toe-weight removed, and Fig. 3 shows the spur drawn out ready to be bent into position to form the fastening-loop.

A represents the hoof of a horse; B, the quarter-boot, provided with the usual attaching-strap $b$; C, the toe-weight, made in the usual form with a dovetailed slot on the side that comes in contact with the hoof A, for the purpose hereinafter described; D, the horseshoe, having a spur E made integral therewith and set at such an inclination backward as will suit the shape of the foot of the horse upon which it is to be placed. The spur E is made tapering in form, so that the slot in the toe-weight will fit over the spur and allow said weight to be moved up and down thereon to any desired position, where it is secured by means of the hole $c'$ in said weight and the set-screw $c^2$, as shown. The upper end $e^2$ of the spur is also drawn out at $e$ to form a shoulder $e'$, which serves as a seat for the end $e^2$ when bent over upon itself to form the loop F, through which the strap $b$ on the boot B passes, and the top portion of the side of the weight nearest the hoof comes in contact with the lower edge of said strap, thus preventing the weight from sliding off the top of the spur should the set-screw drop out and become lost. Nor can the weight be removed from the spur until the strap is removed from the loop. If the boot is not used, a short piece of leather or other material may be inserted in the loop.

The operation is as follows: The shoe D, having the integral spur E and inclined backward to suit the shape of the hoof and its drawn-out upper end $e^2$ bent over and abutting against the shoulder $e'$ to form the loop F, is secured to the horse's hoof in the usual manner. The toe-weight C is then placed over the upper end of loop F and slid down upon the spur to the desired position and secured by set-screw $c^2$. The weight now being attached in position, the boot B is adjusted to the hoof and the strap $b$ inserted through the loop F, which secures the boot to the hoof and at the same time prevents the toe-weight from sliding off the top of the spur should the set-screw loosen or drop out and become lost by the action of the horse in trotting.

I am aware that it is old to secure a toe-weight to a spur by means of a screw, and that it is also old to secure a toe-weight to a spur by means of a strap passing through a loop projecting from said spur through the toe-weight, and therefore claim neither of these devices *per se*. My device differs from such constructions, in that I provide a toe-weight with a device for retaining it on a spur having a loop the body of which projects above the toe-weight, and through the opening of which a secondary retaining device may be inserted, so that if for any reason the main toe-weight-retaining device should become loosened the secondary retaining device would prevent its removal from the spur.

What I claim is—

1. The combination of a horseshoe having a tapering integral spur provided at its upper end with a loop, an adjustable toe-weight on said spur and having a set-screw, and a strap passing through said loop above the toe-weight, for the purpose set forth.

2. The combination of a horseshoe having a tapering integral spur provided at its upper end with a loop, an adjustable toe-weight on said spur and having a set-screw, and a boot having a fastening-strap passing through said loop above the toe-weight, for the purpose set forth.

ORLANDO J. SEFTON.

Witnesses:
S. J. TAYLOR,
W. A. HUME.